L. S. SPAIN.
GEAR CHANGING MECHANISM.
APPLICATION FILED NOV. 9, 1917.
1,287,129.
Patented Dec. 10, 1918.
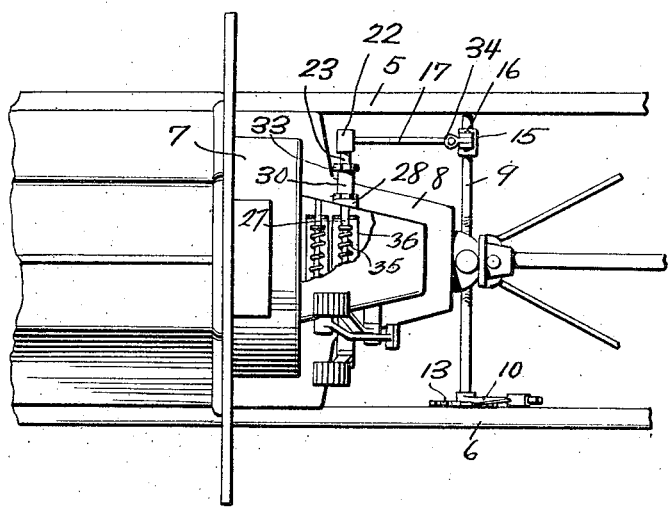
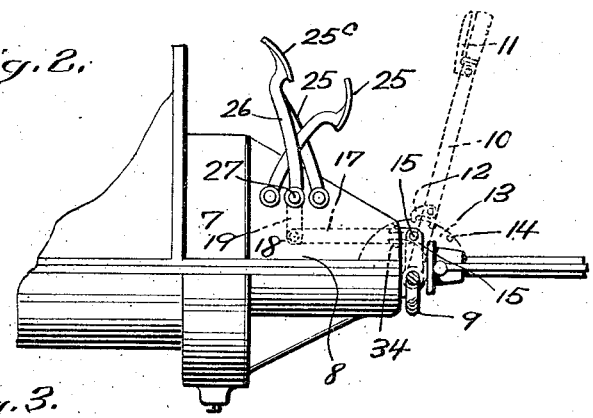
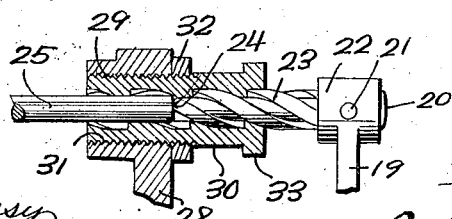
WITNESSES
INVENTOR
Leon S. Spain,
ATTORTEY

UNITED STATES PATENT OFFICE.

LEON S. SPAIN, OF KANSAS CITY, MISSOURI.

GEAR-CHANGING MECHANISM.

1,287,129.  Specification of Letters Patent.  Patented Dec. 10, 1918.

Application filed November 9, 1917. Serial No. 201,120.

*To all whom it may concern:*

Be it known that I, LEON S. SPAIN, a citizen of the United States, residing at Kansas City, in the county of Jackson and State of Missouri, have invented certain new and useful Improvements in Gear-Changing Mechanism, of which the following is a specification.

This invention is a gear changing control mechanism of a type more particularly adapted for use upon self propelled vehicles employing a planetary transmisison, wherein the usual hand brake lever is utilized to throw the transmission into low gear thus leaving the foot free to rest when the low gear is required for long periods such as in hill climbing.

One object of the invention is to provide a mechanism that may be manually operated in conjunction with a foot control and independently thereof, for shifting gears and locking the same when the low gear is particularly engaged.

Another object is to provide a manually operated device connected with a hand lever that may be employed for shifting the gears and operating the clutch.

A further object is to provide the forward gearing shaft operating the transmission bands with a spirally grooved and threaded element that is adapted to rotate and to slide the shaft so that the proper bands may be tightened or loosened for holding the desired reduction or transmission gears in mesh.

A still further object is to provide means for adjusting the relative position of the element and shaft to each other, when the position has been varied or changed through wear and to provide for the first assembly and attachment.

One practical form of construction and assembly will be described and illustrated in the accompanying drawings, in which:—

Figure 1 is a top plan view of the transmission case and the connected operated parts, Fig. 2 is a side elevation showing the mechanism or device in dotted lines, and Fig. 3 is a vertical sectional view of the spirally grooved element with its adjusting means, showing its connection with the movable shaft and a portion of the link.

In the preferred embodiment of the invention about to be described the side frames 5 and 6 are the usual members employed in the construction of self-propelled vehicles.

At 7 there is indicated the magneto housing and at 8 the transmission housing or casing. Adjacent the rear end of the transverse casing 8 there is positioned a transmission shaft 9 that may be suitably journaled in brackets secured to the frames 5 and 6.

The transverse operating and rocking shaft 9 may have secured to it adjacent one end a lever 10 that may be provided with a latch handle 11. At a suitable point upon the lever 10 there may be secured a dog 12 that is adapted to coöperate with a quadrant 13 that may be provided with the notches 14. The latch handle 11 and the dog 12 may be connected together in any suitable or customary manner.

The shaft 9 has its opposite end provided with an upstanding arm 15 that is preferably secured to said shaft. The upper end of the arm 15 may be provided with a hole through which passes a pin 16 so as to adapt it to have a pivotal connection with the link 17. The link 17 is adapted to have a pivotal connection at 18 with the arm 19.

The arm 19 may be secured to a spirally grooved or threaded element 20 in any suitable manner such as is indicated by the pin 21. This pin may pass through suitable holes formed in the end of the arm 19 and through an alining hole in the element 20. The arm 19 is preferably formed with a boss 22 so as to provide a secure connection for the arm 19 with the element 20. The pin 21 passes through this boss or eye end.

The element 20 as shown more particularly in Fig. 3 is spirally grooved, and threaded, and the element may have a single, double, or triple thread 23. It is preferred that each helix of the spiral be formed to have approximately square shoulders so that the threads and grooves are rectangular in cross section. The type of thread employed is that commonly known as the square thread, though any other type may be employed. The end of the element 20, where it projects beyond the boss 22 may be rounded if so desired, or finished in any other mechanical manner. The other end 24 as shown in Fig. 3 is preferably square.

The transmission case 8 is adapted to hold and inclose the usual or customary type of planetary transmission such as is employed upon Ford automobiles. The transmission in this automobile is controlled by means of bands that are operated by the foot pedals indicated at 25. The pedal 25<sup>c</sup> is mounted upon the end of an arm 26 that is secured by any suitable means to the shaft 27. The shaft 27 extends transversely through the transmission case 8 and projects slightly from the opposite side. At this side of the transmission case there is provided a boss 28 that is internally threaded as indicated at 29. To coöperate with the threads 29, sleeve 30 is provided which is externally threaded as indicated at 31.

The sleeve 30 is spirally grooved internally and the grooves therein conform to the grooves formed in the element 20. The element 20 is adapted to be screwed into and out of the sleeve 30 by means of the complementary grooves and threads. To secure the sleeve 30 in proper position with respect to the boss 28 a lock nut 32 is provided. The threads 29 and 31 are adapted to provide for adjustment of the sleeve relatively to the boss 28. After this adjustment has been made or obtained the lock nut 32 is run up and is then adapted to hold the sleeve in its adjusted position. The end 33 may be formed in any suitable manner but it is preferred to shape it so that it may be readily engaged by a wrench.

The shaft 27 is adapted to project through and into the sleeve 30 and its end is suitably squared to engage with the squared end 24 of the element 20, as shown in Fig. 3. This shaft 27 is adapted to be rotated by means of the pedal 25ᶜ and through the construction at the left hand side of the transmission case, the shaft is adapted to move into and out and transversely of said case.

This sliding movement is done so that the spring 35 interposed between the ends of the transmission bands 36 may be contracted and the bands to engage with the drums. In order to hold the pedal 25ᶜ into the low gear position, such as would be done when the pedal is fully depressed, the lever 10 is pulled back which rocks the shaft. The arm 15 will move the link 17 so that the arm 19 will tend to rotate the spirally grooved element 20. As the element 20 is rotated it tends to move within the sleeve 30 by means of the several grooves and threads formed on the element 20 and in the sleeve 30. As the element 20 moves within the sleeve 30, its end 24 is adapted to engage with the end of the shaft 27. This causes a sliding movement to be imparted to the shaft 27 which permits it to pass to the position where the low gear is engaged.

After the lever 10 has been operated to move the shaft 27 and it is desired to hold the transmission in low gear the dog 12 is engaged with one of the notches 14 formed in the edge of the quadrant 13. If desired, in order to produce a freer movement of the link 17 with its pivotal connections 16 and 18 the link may be provided with a joint 34 as shown.

What I claim is:—

1. A gear shifting mechanism comprising in combination with a casing having an opening therein, an interiorly threaded sleeve received within the opening, a threaded rod rotatably mounted in one end of the sleeve, means for rotating the rod, and a gear shifting rod having one end slidable in the opposite end of the sleeve and adapted to be engaged by and operated by the threaded rod.

2. A gear shifting mechanism comprising in combination with a casing having an interiorly threaded opening, an exteriorly and interiorly threaded sleeve received in the threaded opening, a nut rotatably mounted on the sleeve and adapted to engage the casing, a threaded rod rotatably mounted in one end of the sleeve, a lever connected to the threaded rod for rotating the same, and a gear shifting rod received in the opposite end of the sleeve and slidable therein, the end of said gear shifting rod engaging the end of the threaded rod whereby it will be slid longitudinally of the sleeve when the threaded rod is rotated.

In testimony whereof I affix my signature in presence of two witnesses.

LEON S. SPAIN.

Witnesses:
C. A. GROOM,
ALFRED BANNOWSKY.